No. 780,845. PATENTED JAN. 24, 1905.
J. D. WEISSFLOCH.
MEANS FOR EMPTYING DUST BINS OR THE LIKE INTO CARTS OR OTHER RECEPTACLES.
APPLICATION FILED DEC. 28, 1903.
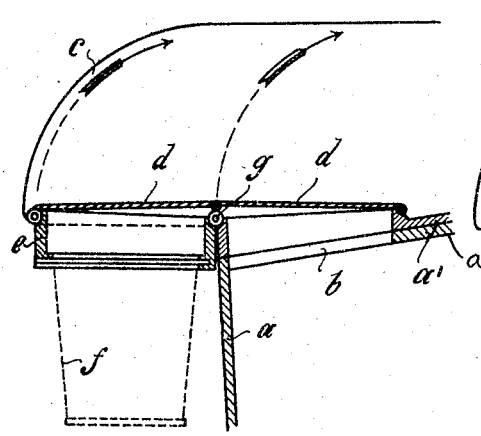
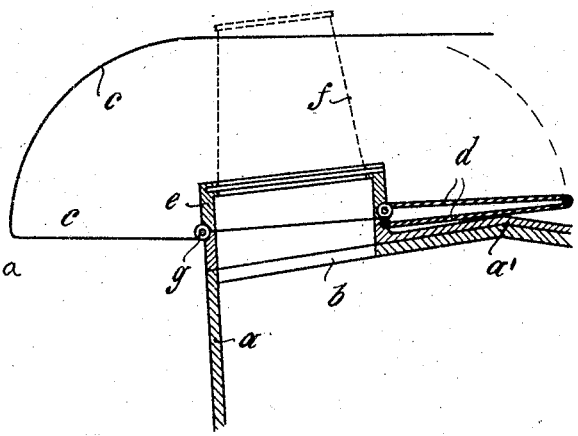
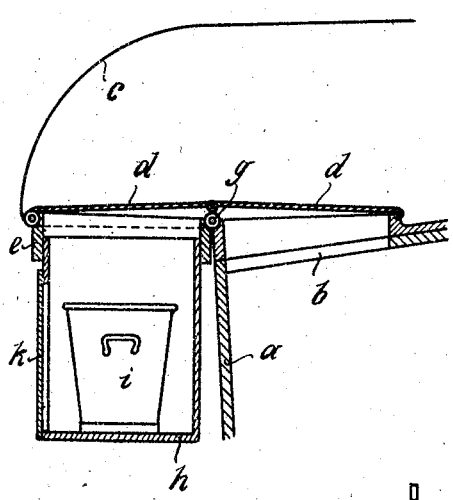
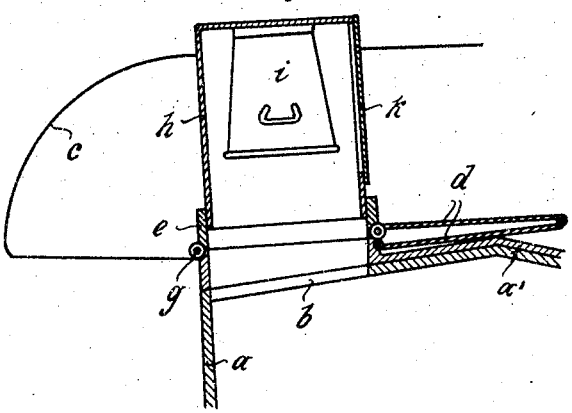
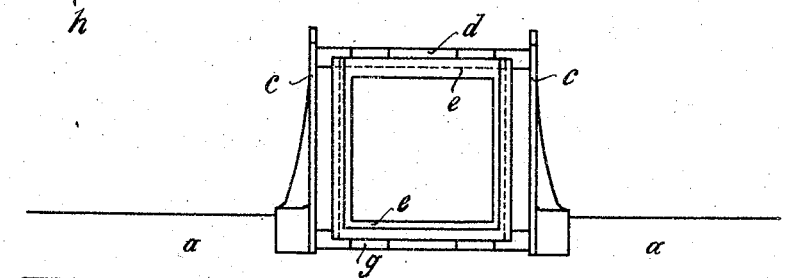
Witnesses.
L. Haldman
C. Heymann
Inventor
Johann David Weissfloch
by B. Singer atty.

No. 780,845. Patented January 24, 1905.

UNITED STATES PATENT OFFICE.

JOHANN DAVID WEISSFLOCH, OF FÜRTH, BAVARIA, GERMANY.

MEANS FOR EMPTYING DUST-BINS OR THE LIKE INTO CARTS OR OTHER RECEPTACLES.

SPECIFICATION forming part of Letters Patent No. 780,845, dated January 24, 1905.

Application filed December 28, 1903. Serial No. 186,886.

*To all whom it may concern:*

Be it known that I, JOHANN DAVID WEISSFLOCH, whose post-office address is No. 6 Cadolzburgerstrasse, Fürth, Bavaria, Germany, have invented certain new and useful Improvements in Means for Emptying Dust-Bins or the Like into Carts or other Receptacles; and I do hereby declare the following to be a full, clear, and exact description of the invention, such as will enable others skilled in the art to which it appertains to make and use the same.

My invention relates to improvements in means for emptying dust-bins and the like into carts or other receptacles without allowing dust to escape. My improved apparatus for this purpose is characterized by great simplicity, and more particularly by the fact that the working parts cannot become clogged with dust.

In the annexed drawings, Figure 1 illustrates in section one form of the invention with the dust-bin in position to be emptied, and Fig. 2 represents the same device with the dust-bin emptied. Figs. 3 and 4 illustrate another form of the invention in similar positions to Figs. 1 and 2, and Fig. 5 is a front view of the device shown in Figs. 1 and 2 with the cover partly lifted.

The cover $a$ of the dust-cart or other receptacle is preferably slightly inclined and is provided with apertures $b$, through which dust can be discharged into the cart and to each of which the discharging apparatus can be applied in turn, according to the extent to which the cart is filled. The discharging apparatus essentially comprises two parallel guide-plates $c$, between which the dust screen or cover is moved. The said dust-screen consists of two plates $d$, pivotally connected to each other, one of which is pivoted to the frame $e$, to which the dust-bin is connected in any known manner. The frame $e$ is substantially a square box open at the top and the bottom and is pivoted at $g$ to the upper part or top cover $a'$ of the box $a$ of a suitable dust-cart. The part $a'$ may be secured to the cart-box in any suitable manner or may be made integral therewith.

The plates $d$ fit closely against the lateral guide-walls $c$, between which they are adapted to slide, and cover the aperture $b$ when closed. The frame $e$ is adapted to be tilted in the direction of the arrow, Fig. 1, by hand or by means of a lever connected to the hinge-pivot $g$ thereof. During the movement of the pivoted plates $d$ into the position shown in Fig. 2 the contents of the dust-bin is discharged through the aperture $b$. After the discharge of the dust the said plates are moved back to their original position. The joints between the guide-plates $c$ and the plates $d$ and frame $e$ can be rendered tighter by means of bars or the like bearing against the said guide-plates and prevent the escape of dust during the entire period of discharging. The sliding surfaces cannot become clogged with dust, because any dust which may adhere to the plates $c$ is removed by the rotation of the plates $d$.

In the form of construction shown in Figs. 3 and 4 a box or the like $g$ $h$, fixedly connected to the pivoted frame $e$, is used. The actual dust-bin $i$ is inserted into this box through a door $k$ and is fixed to the bottom thereof in any suitable manner. The action of this form of the device is the same as that already described.

Having now particularly described and ascertained the nature of my said invention and in what manner the same is to be performed, I declare that what I claim is—

1. In a device for emptying dust-bins and the like into carts or other receptacles, the combination of a frame hinged to said cart and adapted to receive the dust-bin, a plate pivotally connected to said frame, a second plate pivotally connected to said first-named plate and also to said cart, guide-walls adjacent to said plates with which said plates make dust-tight joints, the arrangement being such that when the frame is swung up, the plates are folded back and leave the dust-aperture in the cart open, and when the frame is swung out, the plates close over said aperture, substantially as described.

2. In a device of the character set forth, the combination with a dust-cart provided with an inlet-opening in the top thereof, of a box hinged to said cart-body adjacent to said opening, said box being adapted to receive a dust-receptacle and to swing up to discharge said receptacle through the opening into said cart-body, substantially as described.

In testimony whereof I affix my signature in presence of two witnesses.

JOHANN DAVID WEISSFLOCH.

Witnesses:
  ALEX WISSE,
  MAX SCHNEIDER.